US012632172B2

(12) United States Patent
Kwok

(10) Patent No.: US 12,632,172 B2
(45) Date of Patent: May 19, 2026

(54) SELF-CORRECTED LOW-DENSITY PARITY CHECK (LDPC) WITH INDEX MATCH

(71) Applicant: SK Hynix NAND Product Solutions Corp., Rancho Cordova, CA (US)

(72) Inventor: Zion Kwok, Burnaby (CA)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 67 days.

(21) Appl. No.: 18/656,418

(22) Filed: May 6, 2024

(65) Prior Publication Data

US 2025/0341961 A1     Nov. 6, 2025

(51) Int. Cl.
*G06F 3/06*          (2006.01)

(52) U.S. Cl.
CPC .......... *G06F 3/0604* (2013.01); *G06F 3/0653* (2013.01); *G06F 3/0679* (2013.01)

(58) Field of Classification Search
CPC ..... G06F 3/0604; G06F 3/0653; G06F 3/0679
USPC ........................................................ 714/758
See application file for complete search history.

(56) References Cited

U.S. PATENT DOCUMENTS

2013/0346825 A1 * 12/2013 Marukame ......... H03M 13/1102
                                                                714/758
2018/0351577 A1    12/2018 Qin et al.

2019/0326930 A1 * 10/2019 Palangappa ........ H03M 13/1117
2020/0210274 A1 *  7/2020 Kim ..................... H03M 13/458
2021/0143838 A1     5/2021 Marchand et al.
2021/0165712 A1     6/2021 Mitra et al.
2021/0297092 A1     9/2021 Kang
2022/0398178 A1 * 12/2022 Chopra .............. G06F 11/0709
2024/0080043 A1     3/2024 Ulriksson et al.

OTHER PUBLICATIONS

SK Hynix NAND Product Solutions Corp. (dba Solidigm), PCT/US2025/027501, International Search Report and Written Opinion, Aug. 20, 2025. 9 pgs.

* cited by examiner

*Primary Examiner* — Albert Decady
*Assistant Examiner* — Enam Ahmed
(74) *Attorney, Agent, or Firm* — Morgan, Lewis & Bockius LLP

(57)          ABSTRACT

This application is directed to data validation in an electronic device. The electronic device identifies a set of check nodes associated with a first variable node that corresponds to a data bit in a block of data, and obtains check node data from each of the set of check nodes. Each check node is associated with a set of respective variable nodes including the first variable node, and the check node data identifies at least a respective target node providing the smallest variable node data among the respective variable nodes. The electronic device identifies a subset of check nodes for each of which the check node data identifies the first variable node as the respective target node, determines that the subset of check nodes includes a first number of check nodes, and determines variable node data of the first variable node based on the first number.

20 Claims, 9 Drawing Sheets

204A, 204B, and 204N: collectively 204
206A and 206B: collectively 206
214A, 214B, and 214N: collectively 214
216A, 216B, and 216N: collectively 216 check nodes 402 variable nodes 404

$f_0$  $f_1$  $f_2$  $f_3$  $f_4$ $c_0$  $c_1$  $c_2$  $c_3$  $c_4$  $c_5$  $c_6$  $c_7$  $c_8$  $c_9$

400

420

402   422

404

| Sign (1 bit) | Min1 Magnitude (2-5 bits) | Min2 Magnitude (2-5 bits) | Min1 Index (6-7 bits) | Min2 Index (6-7 bits) |
|---|---|---|---|---|

424   426   428   430   432   422

$$v_m = u_0 + g \sum_{k=1, k \neq m}^{N} u_k$$

516A and 516B: collectively as 516

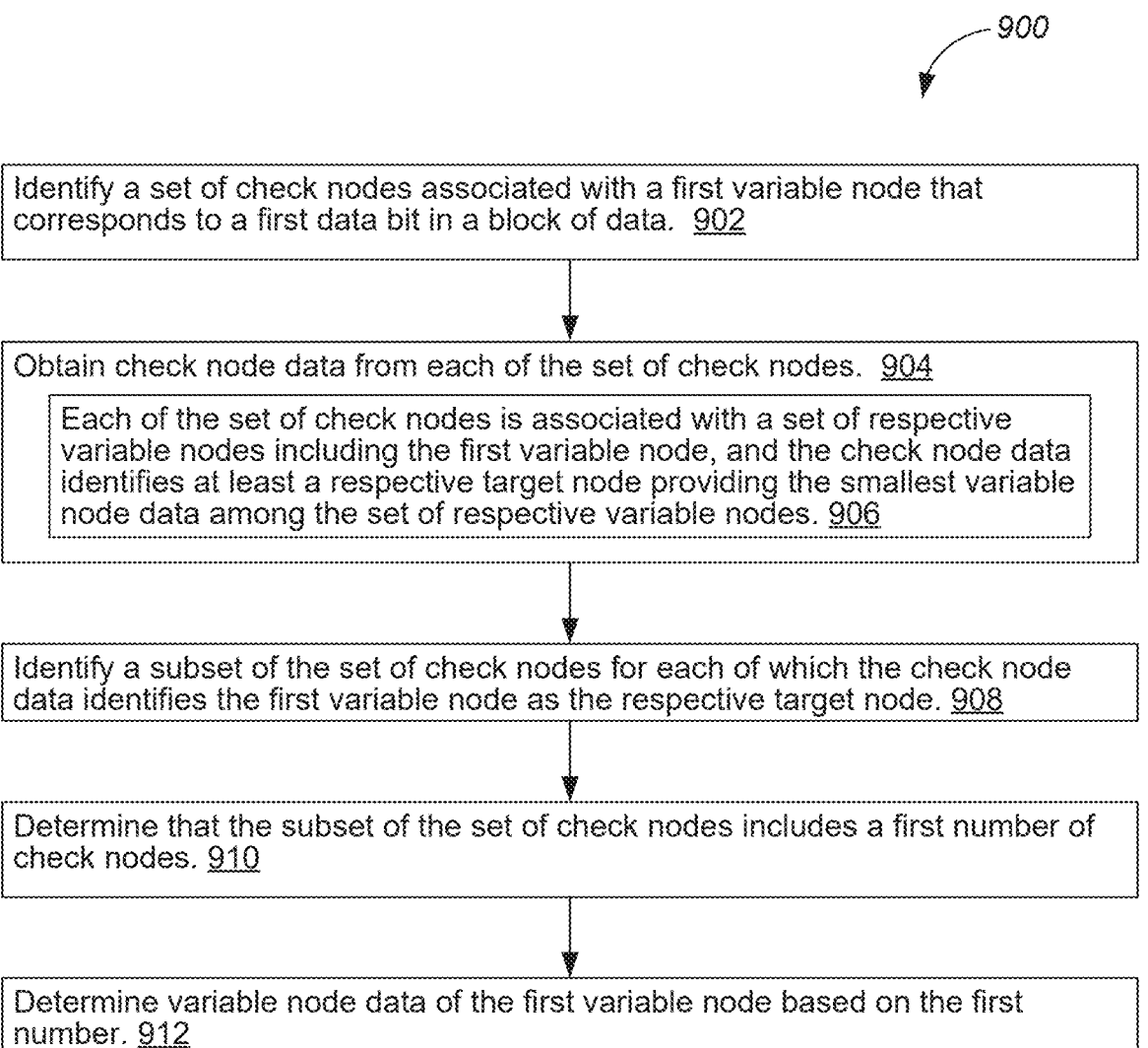

_900_

Identify a set of check nodes associated with a first variable node that corresponds to a first data bit in a block of data. 902

Obtain check node data from each of the set of check nodes. 904

Each of the set of check nodes is associated with a set of respective variable nodes including the first variable node, and the check node data identifies at least a respective target node providing the smallest variable node data among the set of respective variable nodes. 906

Identify a subset of the set of check nodes for each of which the check node data identifies the first variable node as the respective target node. 908

Determine that the subset of the set of check nodes includes a first number of check nodes. 910

Determine variable node data of the first variable node based on the first number. 912

Figure 9

SELF-CORRECTED LOW-DENSITY PARITY CHECK (LDPC) WITH INDEX MATCH

TECHNICAL FIELD

This application relates generally to memory management including, but not limited to, methods, systems, and non-transitory computer-readable media for managing data during data validation in a memory system (e.g., solid-state drive).

BACKGROUND

Memory is applied in a computer system to store instructions and data. The data are processed by one or more processors of the computer system according to the instructions stored in the memory. Multiple memory units are used in different portions of the computer system to serve different functions. Specifically, the computer system includes non-volatile memory that acts as secondary memory to keep data stored thereon if the computer system is decoupled from a power source. Examples of the secondary memory include, but are not limited to, hard disk drives (HDDs) and solid-state drives (SSDs). Min-sum is a popular algorithm for identifying and/or correcting bit errors of user data that is stored in the memory with integrity data (e.g., low-density parity-check (LDPC) codes). A memory controller is applied to identify and/or correct the bit errors based on the LDPC codes. During an integrity check process, the memory controller generates variable node data for each variable node associated with a respective data bit of the user data, facilitating determining a probability of the respective data bit being erroneous. An LDPC decoder is applied based on a min-sum algorithm (MS) involving a plurality of iterations for error correction. The MS-based decoder sometimes corrects bits inaccurately during each min-sum iteration and therefore, has to implement excessive iterations to correct inaccurate bit corrections.

SUMMARY

Various embodiments of this application are directed to methods, systems, devices, non-transitory computer-readable media for low-density parity check (LDPC), e.g., using a min-sum algorithm (MS), in a memory system (e.g., SSD). A min-sum decoder is used to decode LDPC codes may be used to correct bit errors. The min-sum decoder operates on variable nodes that represent codeword bits and check nodes that represent parity-check equations. In accordance with at least some embodiments disclosed herein is the realization of error correction corresponding to a controller iteration rate that improves error correction accuracy within individual iterations. In various embodiments of this application, variable node data of a variable node is selectively set to 0 during a decoding iteration to adjust variable node data (e.g., in a variable-to-check node message) sent by a variable node to a connected check node. Such an iteration rate controlling operation is based on one or more conditions concerning (1) whether the variable node data have been updated with an opposite sign, (2) whether the variable node has provided the lowest variable node data in too many associated check nodes, and/or (3) whether a syndrome weight of a block of data corresponding to the variable node is too large. The syndrome weight means the number of bits in the syndrome vector that are nonzero. The bits of the syndrome vector are typically stored in the check nodes. By these means, some implementations of this application provide an accurate and efficient error correction solution to manage variable node data of variable nodes of user data and enhance the maximum tolerable raw bit error rate (RBER) of a corresponding memory system.

Some implementations of this application is directed to applying a hybrid LDPC method, which is a combination of a min-sum (MS) based LDPC method and a self-corrected min-sum (SCMS) based LDPC method. The SCMS-based LDPC method is applied to adjust the variable node data selectively based on certain conditions. Each check node receives a plurality of variable-to-check messages from a plurality of variable nodes connected to it. The variable node that sends the messages with the lowest magnitude is marked by a first index, and so if a variable node matches the first index, the variable node is flipped, and the messages are not erased. In some embodiments, the hybrid LDPC method improves correction strength, e.g., by 1% for seven-strobe NAND read operations, compared to the MS-based or SCMS-based LDPC method. In some embodiments, this is particularly valuable in quad-level cell (QLC) NAND chips, which have higher RBER than multi-level cell (MLC) or single-level cell (SLC) NAND chips, when every bit of correction strength helps. Stated another way, an uncorrectable rate decreases for the same bit error rate, thereby improving SSD reliability. In some situations, the hybrid LDPC method completes LDPC decoding in a smaller number of iterations and at a faster rate.

In some embodiments, check node information is stored in flip-flops (e.g., in dynamic random-access memory (DRAM) of a memory system) or any other suitable memory device. Each check node is associated with one or more minimum values (e.g., two minimum values) of the variable nodes and associated indexes identifying associated variable nodes. A first index is compared to an index match signal to select one of the associated indexes using a multiplexer. In some embodiments, the index match signal is propagated to a variable node update logic, stored in pipeline stage flip-flops, and used to zero out some variable-to-check messages based on one or more conditions.

In one aspect, a method is implemented at an electronic device to validate data for a memory system (e.g., SSDs). The method includes identifying a set of check nodes associated with a first variable node that corresponds to a first data bit in a block of data. The method further includes obtaining check node data from each of the set of check nodes. Each of the set of check nodes is associated with a set of respective variable nodes including the first variable node, and the check node data identifies at least a respective target node providing the smallest variable node data among the set of respective variable nodes. The method further includes identifying a subset of the set of check nodes for each of which the check node data identifies the first variable node as the respective target node, determining that the subset of the set of check nodes includes a first number of check nodes, and determining variable node data of the first variable node based on the first number.

Some implementations of this application include an electronic device that includes one or more processors and memory having instructions stored thereon, which when executed by the one or more processors cause the processors to perform any of the above methods on a memory system (e.g., SSDs).

Some implementations include a non-transitory computer readable storage medium storing one or more programs. The one or more programs include instructions, which when executed by one or more processors cause the processors to implement any of the above methods on a memory system (e.g., SSDs).

In some embodiments, the above methods, electronic devices, or non-transitory computer readable storage medium for managing LDPC-based check node data are also used in communication (e.g., wireless communication using 5G or Wi-Fi technology, satellite communications, Ethernet communication, and communication via fiber Optic networks).

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 9 is a flow diagram of an example process of validating data, in accordance with some embodiments.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Min-sum is applied to correct bit errors in the LDPC codes. LDPC decoding is typically visualized as a Tanner graph with variable nodes and check nodes, and messages are exchanged between the variable and check nodes on the Tanner graph during integrity check and error correction. In some embodiments, a min-sum decoder operates on variable nodes that represent codeword bits and check nodes that represent parity-check equations. During a decoding iteration, variable node data of a variable node is selectively set to 0 to adjust variable node data (e.g., in a variable-to-check node message) sent by a variable node to a connected check node. This operation controls an iteration rate of error correction, and is adaptively applied based on one or more conditions concerning (1) whether the variable node data have been updated with an opposite sign, (2) whether the variable node has provided the lowest variable node data in too many associated check nodes, and/or (3) whether a syndrome weight of a block of data corresponding to the variable node is too large. By these means, some implementations of this application provide an accurate and efficient error correction solution to manage variable node data of variable nodes of user data and enhance error correction strength and rate of a corresponding memory system (e.g., a QLC NAND flash).

Figure 1:
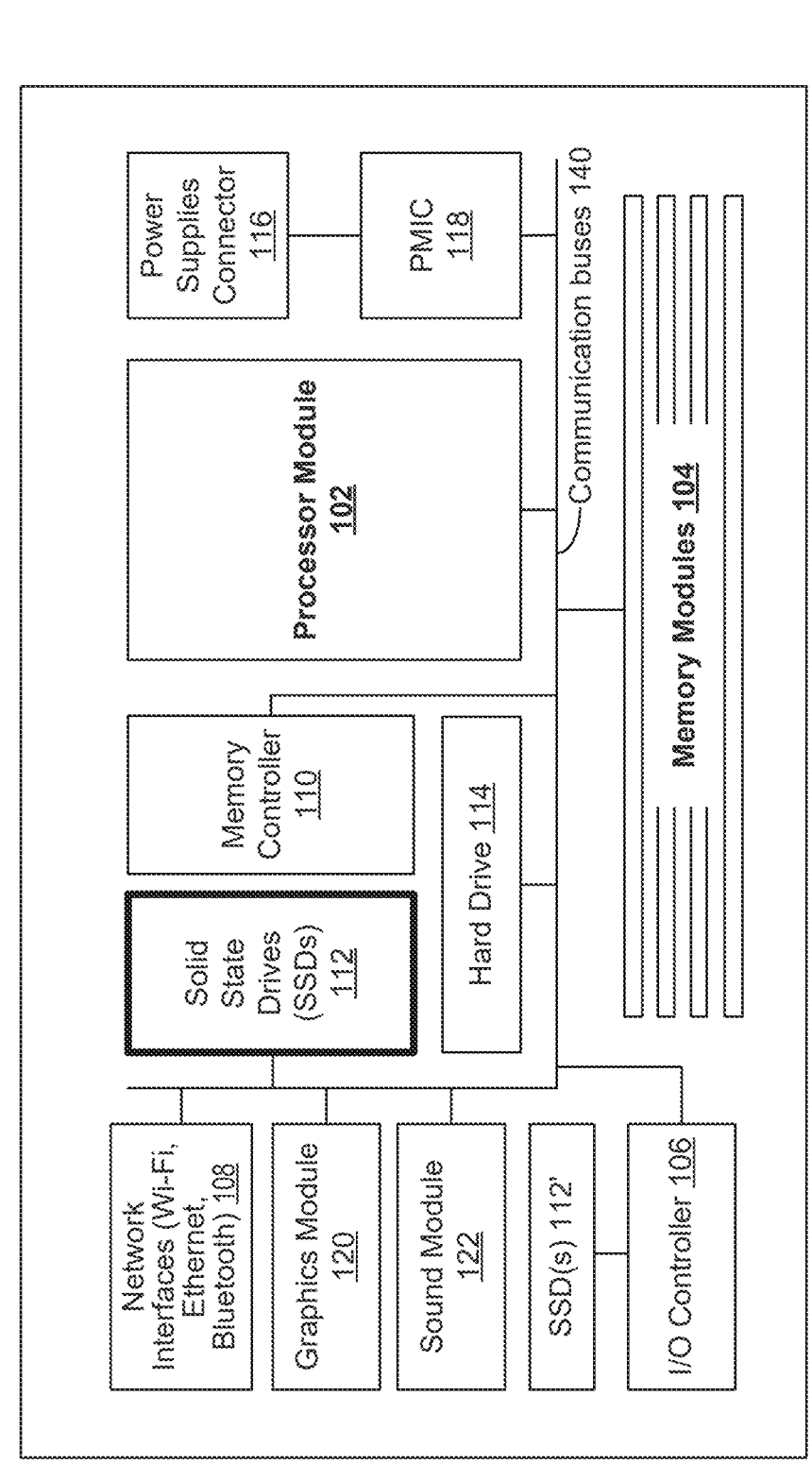
FIG. 1 is a block diagram of an example system module in a typical electronic device, in accordance with some embodiments.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a trackpad) via a universal serial bus interface. In some embodiments, the network interfaces 108 includes one or more interfaces for Wi-Fi, Ethernet and Bluetooth networks, each allowing the electronic system to exchange data with an external source, e.g., a server or another electronic system. In some embodiments, the communication buses 140 include circuitry (sometimes called a chipset) that interconnects and controls communications among various system components included in system module 100.

In some embodiments, the memory modules 104 include high-speed random-access memory, such as static random-access memory (SRAM), double data rate (DDR) dynamic random-access memory (DRAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104.

Once inserted into the memory slots, the memory modules 104 are integrated into the system module 100.

In some embodiments, the system module 100 further includes one or more components selected from a memory controller 110, SSD(s) 112, an HDD 114, power management integrated circuit (PMIC) 118, a graphics module 120, and a sound module 122. The memory controller 110 is configured to control communication between the processor module 102 and memory components, including the memory modules 104, in the electronic system. The SSD(s) 112 are configured to apply integrated circuit assemblies to store data in the electronic system, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. The graphics module 120 is configured to generate a feed of output images to one or more display devices according to their desirable image/video formats. The sound module 122 is configured to facilitate the input and output of audio signals to and from the electronic system under control of computer programs.

Alternatively or additionally, in some embodiments, the system module 100 further includes SSD(s) 112' coupled to the I/O controller 106 directly. Conversely, the SSDs 112 are coupled to the communication buses 140. In an example, the communication buses 140 operates in compliance with Peripheral Component Interconnect Express (PCIe or PCI-E), which is a serial expansion bus standard for interconnecting the processor module 102 to, and controlling, one or more peripheral devices and various system components including components 110-122.

Further, one skilled in the art knows that other non-transitory computer readable storage media can be used, as new data storage technologies are developed for storing information in the non-transitory computer readable storage media in the memory modules 104, SSD(s) 112 or 112', and HDD 114. These new non-transitory computer readable storage media include, but are not limited to, those manufactured from biological materials, nanowires, carbon nanotubes and individual molecules, even though the respective data storage technologies are currently under development and yet to be commercialized.

Some implementations of this application are directed to an integrity check process implemented by a memory system (e.g., SSD 112, memory module 104, HDD 114, memory controller 110), which stores codeword symbols including integrity data, e.g., LDPC codes. The integrity check process is also called a decoding process and visualized by a Tanner graph with variable nodes and check nodes. The variable nodes correspond to the codeword symbols extracted from the memory system. Each check node corresponds to a distinct set of variable nodes, and has check node data configured to identify or correct bit errors in the codeword symbols corresponding to the distinct set of variable nodes. Specifically, messages are exchanged between the variable and check nodes on the Tanner graph to update the variable node data and check node data, until the bit errors are identified and corrected in the codeword symbols.

Figure 2:
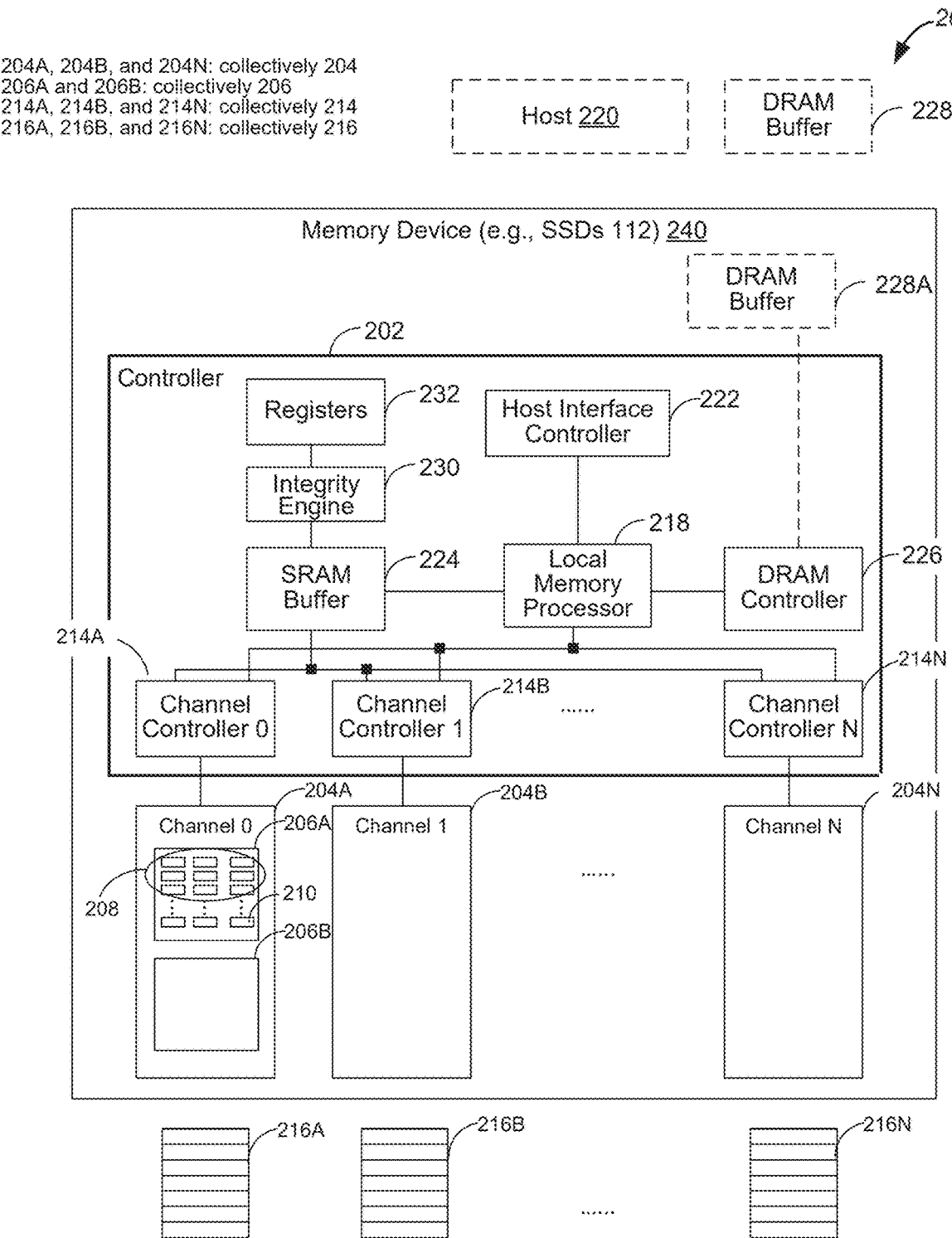
FIG. 2 is a block diagram of a memory system of an example electronic device having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 includes one or more memory devices 240 (e.g., SSD(s)). Each memory device 240 further includes a controller 202 and a plurality of memory channels 204 (e.g., channel 204A, 204B, and 204N). Each memory channel 204 includes a plurality of memory cells. The controller 202 is configured to execute firmware level software to bridge the plurality of memory channels 204 to the host device 220. In some embodiments, each memory device 240 is formed on a printed circuit board (PCB).

Each memory channel 204 includes on one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory device 240 includes a plurality of superblocks. Each superblock includes a plurality of memory blocks each of which further includes a plurality of memory pages 210. For each superblock, the plurality of memory blocks are configured to be written into and read from the memory system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The memory device 240 stores information of an ordered list of superblocks in a cache of the memory device 240. In some embodiments, the cache is managed by a host driver of the host device 220, and called a host managed cache (HMC).

In some embodiments, the memory device 240 includes a single-level cell (SLC) NAND flash memory chip, and each memory cell stores a single data bit. In some embodiments, the memory device 240 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory device 240 corresponds to a single queue 216 of memory access requests. Each memory access request is optionally received internally from the memory device 240 to manage the respective memory channel 204 or externally from the host device 220 to write or read data stored in the respective channel 204. Specifically, each memory access request includes one of: a system write request that is received from the memory device 240 to write to the respective memory channel 204, a system read request that is received from the memory device 240 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller to implement internal memory management functions including, but are not limited to, garbage collection, wear levelling, read disturb mitigation, memory snapshot capturing, memory mirroring, caching, and memory sparing.

In some embodiments, in addition to the channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228A that is included in memory device 240, e.g., by way of DRAM controller 226. Alternatively, in some embodiments, the local memory processor 218 stores data to be written into, or read from, each memory block in the plurality of memory channels 204 in a DRAM buffer 228B that is main memory used by the processor module 102 (FIG. 1). The local memory processor 218 of the controller 202 accesses the DRAM buffer 228B via the host interface controller 222.

Figure 3:
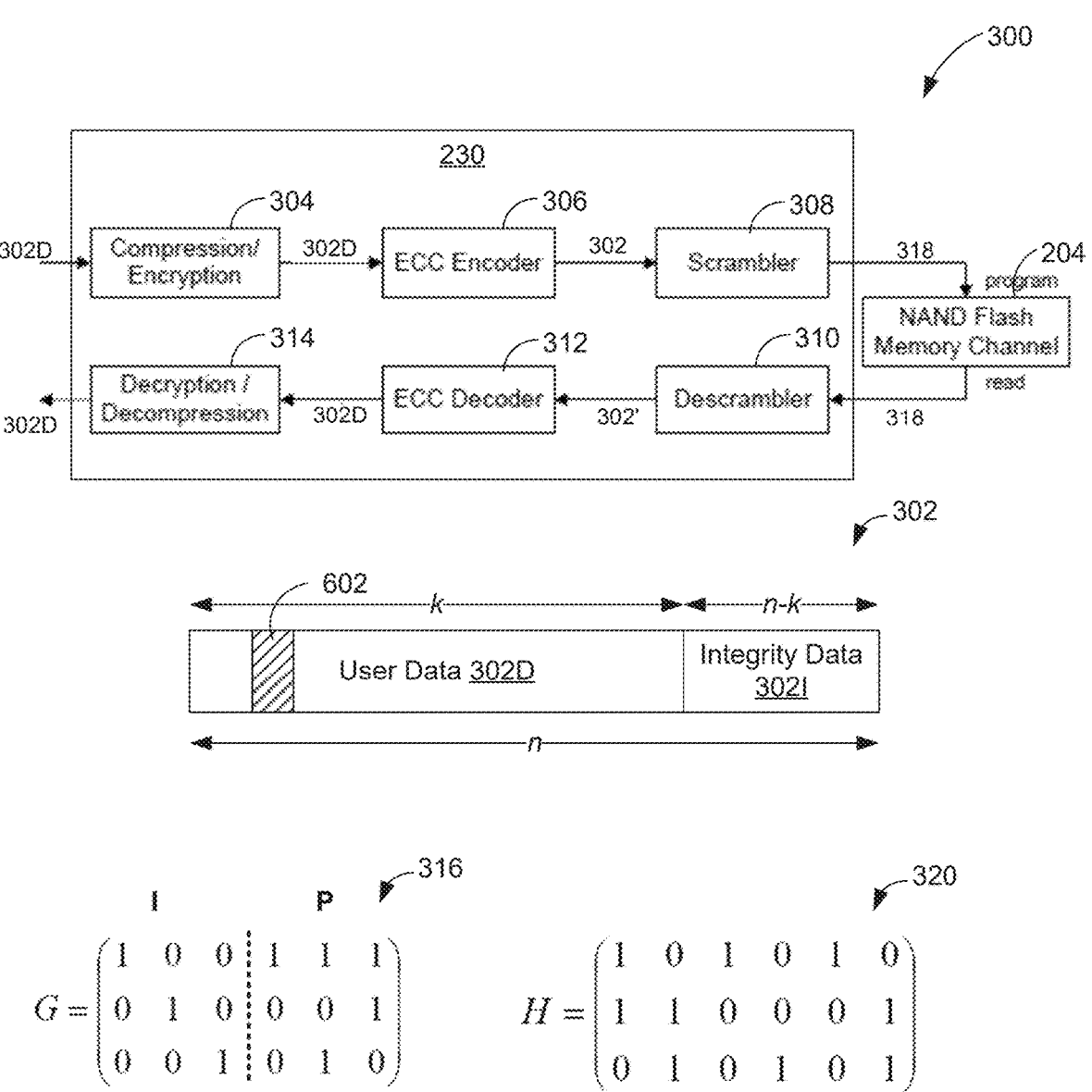
FIG. 3 is a block diagram of an example integrity check system of a memory system for processing a codeword, in accordance with some embodiments.

In some embodiments, data in the plurality of memory channels 204 is grouped into coding blocks, and each coding block is called a codeword (FIG. 3, 302). For example, each codeword includes n bits among which k bits correspond to user data and (n–k) corresponds to integrity data of the user data, where k and n are positive integers. In some embodiments, the memory system 200 includes an integrity engine 230 (e.g., an LDPC engine) and a registers 232 including a plurality of registers or SRAM cells or flip-flops and coupled to the integrity engine 230. The integrity engine 230 is coupled to the memory channels 204 via the channel controllers 214 and SRAM buffer 224. Specifically, in some embodiments, the integrity engine 230 has data path connections to the SRAM buffer 224, which is further connected to the channel controllers 214 via data paths that are controlled by the local memory processor 218. The integrity engine 230 is configured to verify data integrity for each coding block of the memory channels 204 using variable nodes and check nodes, and messages are exchanged between the variable and check nodes during the integrity check process. A subset of these messages is selected and temporarily stored in the registers 232 as variable node data or check node data.

FIG. 3 is a block diagram of an example integrity check system 300 of a memory system 200 for processing a codeword 302, in accordance with some embodiments. The integrity check system 300 includes a plurality of memory channels 204, an integrity engine 230 (e.g., an LDPC engine), and a registers 232. Data stored in memory channels 204 of the memory system 200 (FIG. 2) is grouped into coding blocks, and each coding block is called a codeword 302. Each codeword 302 further includes n data bits among which k data bits are user data 302D and (n–k) data bits are integrity data 302I of the user data 302D, where k and n are positive integers. The integrity check system 300 is configured to verify data integrity for each codeword 302 of the memory channels 204 using variable nodes 404 and check nodes 402 (FIG. 4).

In some embodiments, the integrity engine 230 further includes one or more of: a compression module 304, an error correction code (ECC) encoder 306, a scrambler 308, a descrambler 310, an ECC decoder 312, and a decompression module 314. The compression module 304 obtains user data 302D and processes (e.g., compresses, encrypts) the user data 302D. The ECC encoder 306 obtains the user data 302D that is optionally processed by the compression module 304, and applies a parity data generation matrix G (316) on the user data 302D to encode the codeword 302. The matrix G (316) has k rows and n columns. A systematic form of the matrix G includes an identify matrix I configured to preserve the user data 302D within the codeword 302 and a parity matrix P configured to generate the integrity data 302I from the user data 302D. In some embodiments, the matrix G (316) is not unique and includes a set of basis vectors for a vector space of valid codewords 302. The scrambler 308 obtains the codeword 302 including n data bits and converts the n data bits to a scrambled codeword 318 having a seemingly random output string of n data bits. The scrambled codeword 318 is stored in the memory channels 204 of the memory system 200.

During decoding, the scrambled codeword 318 is extracted from the memory channel 204 of the memory system 200. The descrambler 310 recovers a codeword 302' from the scrambled codeword 318, and the ECC decoder 312 verifies whether the recovered codeword 302' is valid and corrects erroneous bits in the recovered codeword 302, thereby providing the valid codeword 302 including the valid user data 302D. In some embodiments, the decompression module 314 obtains the user data 302D and processes (e.g., decompresses, decrypts) the user data 302D. In some embodiments, for integrity check, the ECC decoder 312 applies a parity-check matrix H (320) on the recovered codeword 302' to generate a syndrome vector S. The parity check matrix H (320) includes n−k rows corresponding to n−k parity check equations and n columns corresponding to n codeword bits. A relationship of the recovered codeword 302' and the syndrome vector s is represented as follows:

$$S = yH^T \qquad (1)$$

where y is the recovered codeword 302'. In some embodiments, in accordance with a determination that the syndrome s is equal to 0, the ECC decoder 312 determines that all parity-check equations associated with the parity-check matrix H are satisfied and that the recovered codeword 302' is valid. Conversely, in accordance with a determination that the syndrome is not equal to 0, the ECC decoder 312 determines that at least a predefined number (e.g., one, two) parity check equation associated with the parity-check matrix H is not satisfied and that the recovered codeword 302' is not valid. Alternatively, in some embodiments, the ECC decoder 312 operates to solve the following equation:

$$S = eH^T \qquad (2)$$

where e is an error vector. The syndrome vector s is a combination of the error vector e and a valid codeword 302. Given that the syndrome vector s and the parity check matrix H are known, the ECC decoder 312 solves equation (2) to obtain the error vector e and identify the erroneous bits in the recovered codeword 302'.

Figure 4A:
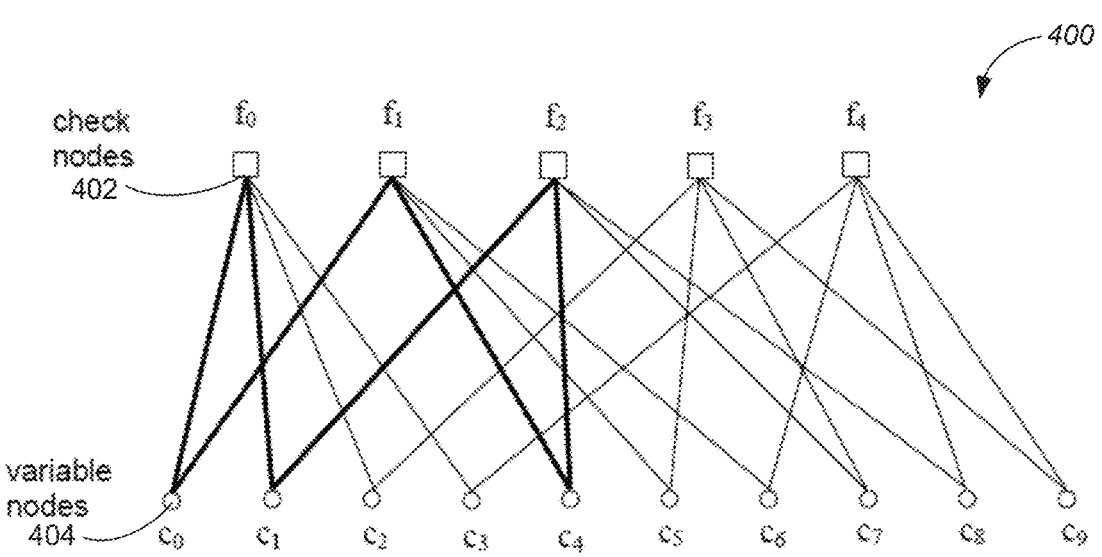
FIG. 4A is a Tanner graph applied to implement LDPC coding using check nodes and variable nodes, in accordance with some embodiments.

FIG. 4A is a Tanner graph 400 applied to implement LDPC coding using check nodes 402 and variable nodes 404, in accordance with some embodiments. Data stored in a memory system 200 (FIG. 2) is verified on a codeword basis. Each codeword 302 includes n data bits among which k data bits are user data 302D and n−k data bits are integrity data 302I of the user data 302D, where k and n are positive integers. In some embodiments, the parity check matrix H (320) is applied without differentiating the user data 302D and the integrity data 302I during integrity check. The parity-check matrix H (320) includes n−k rows corresponding to n−k parity-check equations and n columns corresponding to n codeword bits, where k and n are positive integers. Each parity-check equation combines corresponding n codeword bits (also called codeword symbols), and therefore, corresponds to a check node 402 that is connected up to a subset or all of the n variable nodes 404. In some embodiments, only j codeword bits in the n codeword bits correspond to 1 in the parity check matrix H (320) for a row corresponding to check node 402, where j is an integer less than n, and the check node 402 is connected to the j variable nodes 404. In some embodiments, each and every check node 402 is connected to the same number of variable nodes 404 (e.g. j variable nodes 404). Alternatively, in some embodiments, each check node 402 is connected to a respective number of variable nodes 404, and at least two check nodes 402 are connected to different numbers of variable nodes 404.

Referring to FIG. 4A, in this example, the codeword 302 has 10 codeword symbols (also called codeword bits). Five parity check equations are applied to do integrity check on the codeword 302, and each parity check equation is applied on a set of four codeword symbols (j=4). As such, the Tanner graph 400 includes five check nodes 402 ($f_0$-$f_4$) and each check node 402 is connected to four respective variable nodes 404 each corresponding to a distinct set of four codeword symbols of the codeword 302.

In some embodiments, the ECC decoder 312 solves equation (2) to obtain the error vector e and identify one or more erroneous bits in the codeword 302 by an iterative integrity check process. Messages are exchanged between the variable nodes 404 and check nodes 402 on the Tanner graph 400 until the one or more erroneous bits are identified or corrected in the codeword 302. Each variable node 404 is assigned with initial variable node data. In some embodiments, the initial variable node data includes a log-likelihood ratio (LLR) that is determined based on data measured when a read reference voltage is adjusted for the memory system 200. Each check node 402 is connected to a set of variable nodes 404, and receives messages including the initial variable node data from the set of variable nodes 404. For each check node 402, the check node data is determined based on the initial variable node data of the set of variable nodes 404, and indicates a likelihood of a set of codeword symbols corresponding to the set of variable nodes 404 being erroneous. Conversely, each variable node 404 is also connected to a set of check nodes 402 on the Tanner graph 400, and receives messages including the check node data from the set of check nodes 402. For each variable node 404, variable node data is updated based on the check node data 422 of the set of variable nodes 404. By these means, the messages are exchanged between the check nodes 402 and variable nodes 404 until an integrity check requirement is satisfied, and the one or more erroneous bits are identified or corrected based on the variable node data or the check node data. In some embodiments, the integrity check requirement is satisfied when sign 424 is 0 for all check nodes 402.

Figure 4B:
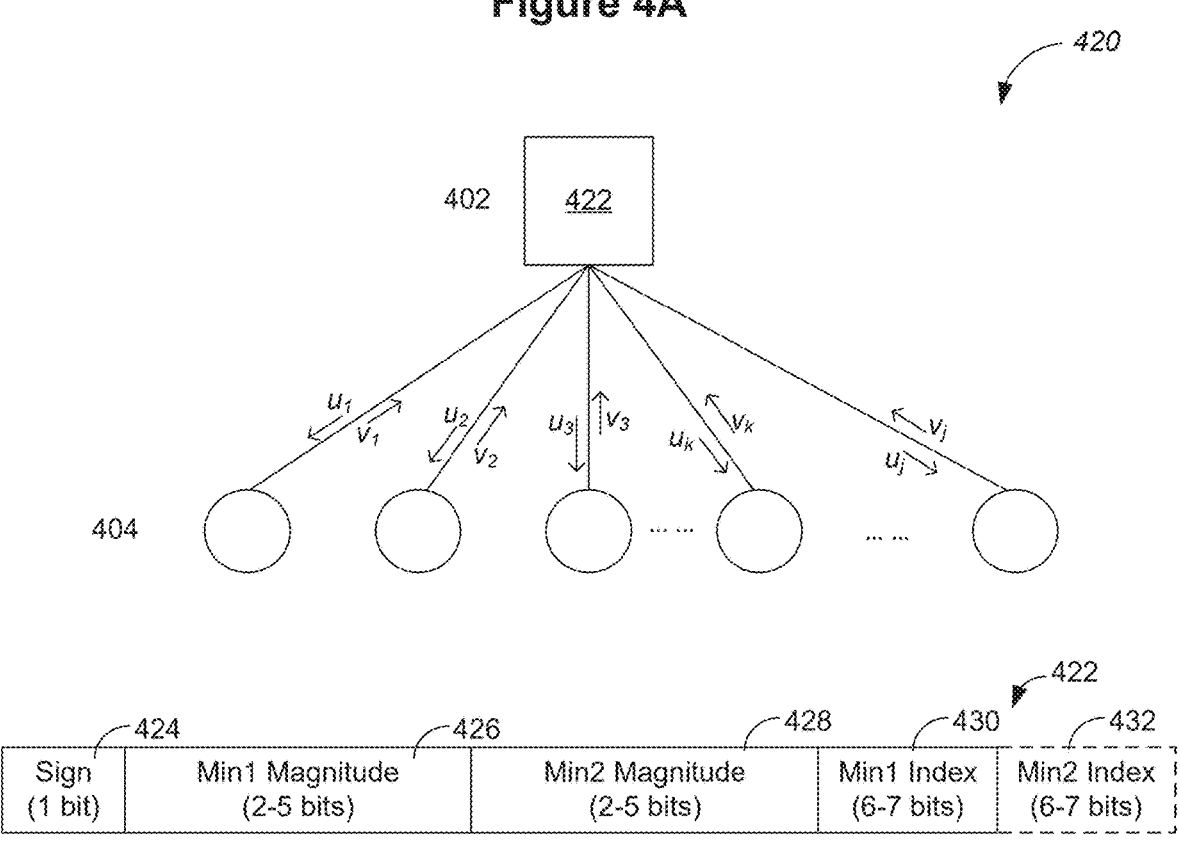
FIG. 4B is a simplified Tanner graph having a single check node coupled to a set of variable nodes, in accordance with some embodiments.

FIG. 4B is a simplified Tanner graph 420 having a single check node 402 coupled to a set of variable nodes 404, in accordance with some embodiments. Check node 402 receives variable-to-check node message data $v_1$, $v_2$, $v_3$, . . . . $v_j$ from j variable nodes 404, where j is also known as the degree of the check node, de. After a check node update is performed based on a min-sum algorithm, check node 402 sends check-to-variable node message data $u_1$, $u_2$, $u_3$, . . . $u_j$ to $d_c$ variable nodes 404. Details about the check node update calculation for k, where k is an integer in the range [1, $d_c$], are as follows:

$$u_k = \left( \prod_{m=1, m \neq k}^{d_c} \text{sign}(v_m) \right) \times \min_{m \neq k} |v_m| \qquad (3)$$

-continued $$\operatorname{sign}(u_k) = \left( \prod_{m=1, m \neq k}^{d_c} \operatorname{sign}(v_m) \right) \quad (4)$$

$$|u_k| \min_{m \neq k} |v_m| = \begin{cases} \text{Min2 Magnitude, } k = \text{Min1 Index} \\ \text{Min1 Magnitude, } k \neq \text{Min1 Index} \end{cases} \quad (5)$$

where Min1 and Min2 correspond to two variable nodes 404 having the most minimum variable-to-check node message magnitude and the second minimum variable-to-check node message magnitude, respectively. The check node data 422 includes a sign bit 424, a first likelihood data item 426 (Min1 Magnitude), a second likelihood data item 428 (Min2 Magnitude), and a first index data item 430 (Min1 Index). In accordance with equation (4), the sign bit 424 is generated based on signs of the variable-check node message data $(v_1 \text{-} v_m)$ from the set of variable nodes 404. Stated another way, the sign bit 424 is a combination of signs of respective likelihood data items of a subset of codeword symbols corresponding to the set of variable nodes 404. The first likelihood data item 426 and the second likelihood data item 428 include magnitudes of the most minimum variable-to-check node message data (Min1) and the second minimum variable-to-check node message data (Min2) of the set of variable nodes 404, respectively. The first index data item 430 identifies one of the set of variable nodes 404 corresponding to the first likelihood data item 426. In some embodiments, the check node data 422 further includes a second index data item 432 identifying a second one of the set of variable nodes 404 corresponding to the second likelihood data item 428.

Figure 4C:
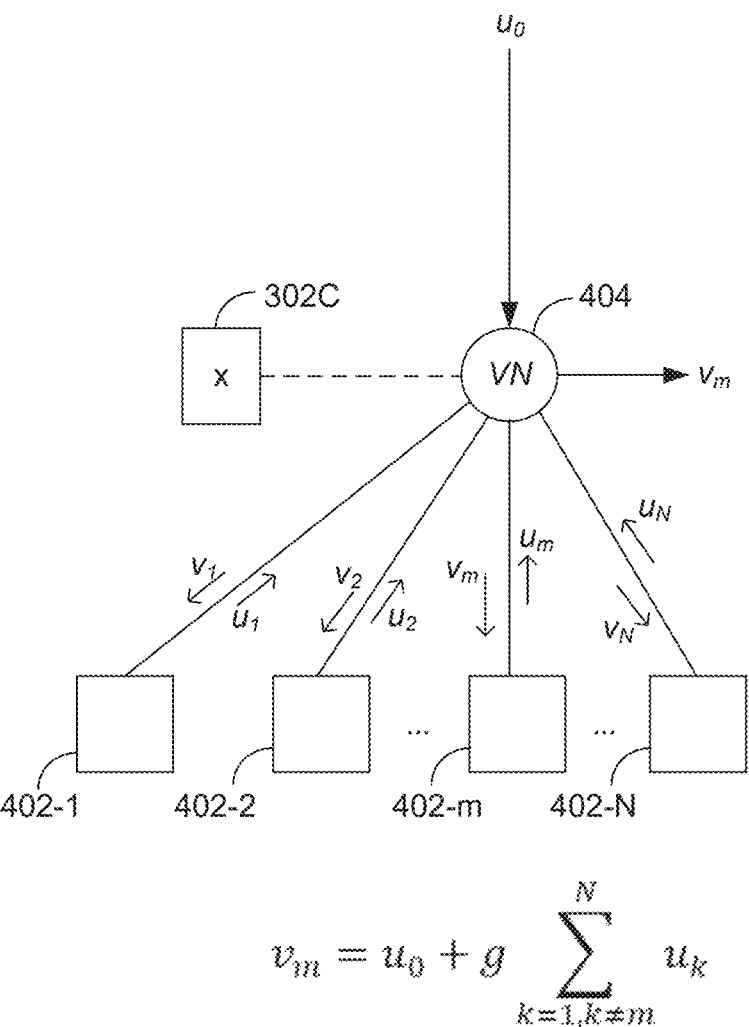
FIG. 4C is another simplified Tanner graph having a single variable node coupled to a set of check nodes, in accordance with some embodiments.

FIG. 4C is another simplified Tanner graph 420 having a single variable node 404 coupled to a set of check nodes 402, in accordance with some embodiments. Each single variable node 404 corresponds to a first data bit 302C (e.g., $c_0$, $c_1$, ..., $c_9$ in FIG. 4A) of the codeword 302. Data bit is also called codeword symbol. The variable node 404 receives check-to-variable node message data $u_1$, $u_2$, $u_3$, ... $u_N$ (also called check node data) from N check nodes 402, where N is also known as a degree of the variable node 404. When a variable node update is performed based on a min-sum algorithm, each of the N check nodes 402 sends check-to-variable node message data $u_1$, $u_2$, $u_3$, ... $u_N$ to the same variable node 404. Variable-to-check node message data $v_m$ (also called variable node data) is further generated based on the check-to-variable node message data $u_1$-$u_N$, and sent from the variable node 404 to an m-th check node of the set of check nodes 402, where m is an integer in the range [1, N]. The variable-to-check node message data $v_m$ is represented as follows:

$$v\_m = u\_0 + \sum\_(k = 1, \ k \neq m) \wedge (d\_v) u\_k \quad (6)$$

where $u_0$ is an intrinsic likelihood of the first data bit 302C in an example. In another example, $u_0$ is an intrinsic likelihood of the first data bit 302C being a logic bit 1. In yet another example, $u_0$ is an intrinsic likelihood of the first data bit 302C being erroneous. In some embodiments, a scaling factor g is used to multiply a sum of check-to-variable node message data, and the sum and an intrinsic likelihood $u_0$ (also called input LLR) in the variable node update are combined to generate the variable-to-check node message data $v_m$ as follows:

$$v\_m = u\_0 + g\Sigma\_(k = 1, k \neq m) \wedge N u\_k \quad (7)$$

where g is the scaling factor.

Figure 5A:
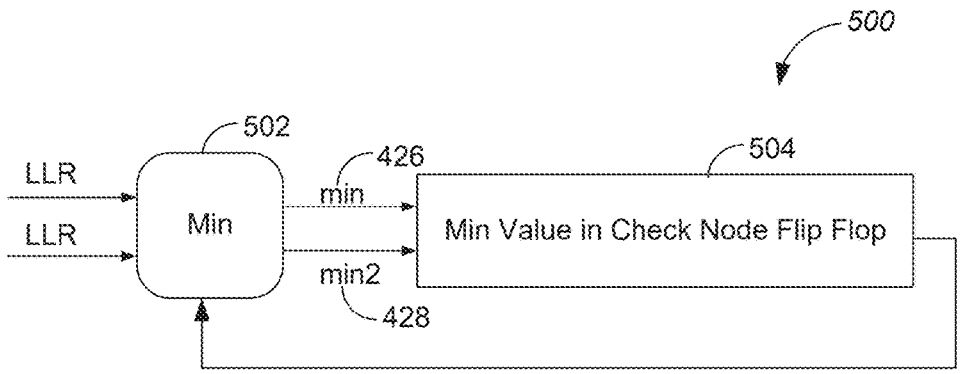
FIG. 5A is a schematic diagram of a sequence of check node operations implemented to determine check node data of a check node during LDPC decoding, in accordance with some embodiments.

FIG. 5A is a schematic diagram of a sequence of check node operations 500 implemented to determine check node data of a check node 402 during LDPC decoding, in accordance with some embodiments. LDPC decoding is performed based on a min-sum method. An integrity engine 230 (FIG. 2) organizes a plurality of arithmetic units and a registers 232 to implement an instruction corresponding to the min-sum method without frequently interacting with a local memory processor 218. Specifically, each check node 402 corresponds to a parity-check equation that combines corresponding n codeword symbols (also called codeword bits), and is connected to a subset of the n variable nodes 404. In some embodiments, only j codeword symbols in the n codeword symbols are associated with non-zero coefficients in the parity-check equation, and the check node 402 is connected to the j variable nodes 404. For each check node 402, the plurality of arithmetic units includes a comparator operator 502 coupled to flip-flops 504 in a registers 232 (FIG. 2). The comparator operator 502 receives variable-to-check node message data from a subset of the j variable nodes 404 connected to the check node 402, and check node data 422, and determines the first likelihood data item 426 and the second likelihood data item 428, corresponding to the most minimum variable-to-check node message data (Min1) and the second minimum variable-to-check node message data (Min2) of the set of j variable nodes 404, respectively. The first likelihood data item 426 and the second likelihood data item 428 are stored into the flip flops 504 of the registers 232. In some embodiments, the variable-to-check node message data from each of the set of j variable nodes 404 includes an LLR that is determined based on data measured when a read reference voltage is adjusted for the memory system 200.

Figure 5B:
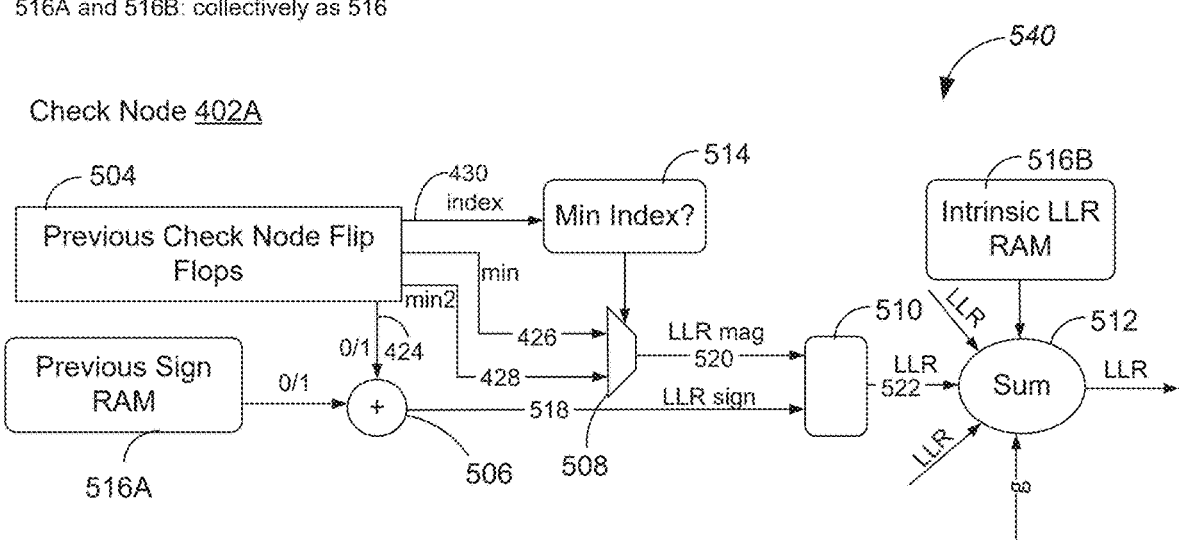
FIG. 5B is a schematic diagram of a sequence of variable node operations implemented to determine variable node data of a variable node during LDPC decoding, in accordance with some embodiments.

FIG. 5B is a schematic diagram of a sequence of check node and variable node operations 540 implemented to determine variable-to-check node message data $v_m$ from a variable node 404 during LDPC decoding, in accordance with some embodiments. For each variable node 404, the plurality of arithmetic units organized by the integrity engine 230 includes a sign operator 506, a multiplexer 508, a combiner 510, a sum operator 512, an index identifier 514, and one or more random access memory (RAM) 516. The RAM 516 stores data involved in the check node and variable node operations 540 temporarily. In some embodiments, the registers 232 further includes the RAM 516 associated with these check node and variable node operations 540. Each variable node 404 is connected to a set of check nodes 402, and applied in a set of parity-check equations corresponding to the set of check nodes 402. One of the set of check nodes 402 corresponds to check node data stored in the flip-flops 504 and including a sign bit 424, a first likelihood data item 426, a second likelihood data item 428, and a first index data item 430. A previous variable-to-check node message data sign stored in a RAM 516A is combined with the sign bit 424 by the sign operator 506 to form an LLR sign 518. The index identifier 514 compares an index k of the variable node 404, which uniquely identifies one variable node 404 among the j variable nodes connected to one check node 402, with the first index data item 430. In accordance with a comparison result, the multiplexer 508 selects one of the likelihood data items 426 and 428 as a likelihood data item 520, and the combiner 510 generates a signed LLR data item 522 that is sent from check node 402 to variable node 404 based on the LLR sign 518 and likelihood data item 520 (e.g., a value of $u_k$ in equations (6) and (7)). Specifically, in some embodiments, in accordance with a determination that the index k of the variable node 404 is equal to the first index data item 430, the multiplexer 508 selects the second likelihood data item 428 as the likelihood data item 520 (e.g., a value of $u_k$ in equations (6) and (7)). Conversely, in some embodiments, in accordance with a determination that the index k of the variable node 404 is not equal to the first index data item 430, the multiplexer 508 selects the first likelihood data item 426 as the likelihood data item 520.

In some embodiments, intrinsic LLR data (e.g., intrinsic likelihood $u_0$) corresponds to initial variable node data of each variable node 404 associated with a respective codeword symbol of a codeword 302. The intrinsic LLR data is determined based on a log-likelihood ratio (LLR) that is approximated as follows:

$$LLR(y) = \ln(p(x = 0|y))/(p(x = 1|y)) = \ln(p(y|x = 0))/(p(y|x = 1)) \quad (8)$$

where p(|) is a probability of a combination of data values, x is a value stored for the respective codeword symbol, and y is a correct value of the respective codeword symbol. The intrinsic LLR data is determined based on data measured when a read reference voltage is adjusted for the memory system 200.

The sum operator 512 combines intrinsic LLR data stored in the RAM 516B, LLR data items 522 (e.g., $u_k$ in equations (6) and (7)), and scaling factor g for the set of check nodes 402 to update the variable node data (e.g., variable-to-check node message data $v_m$) associated with the variable node 404.

Figure 6:
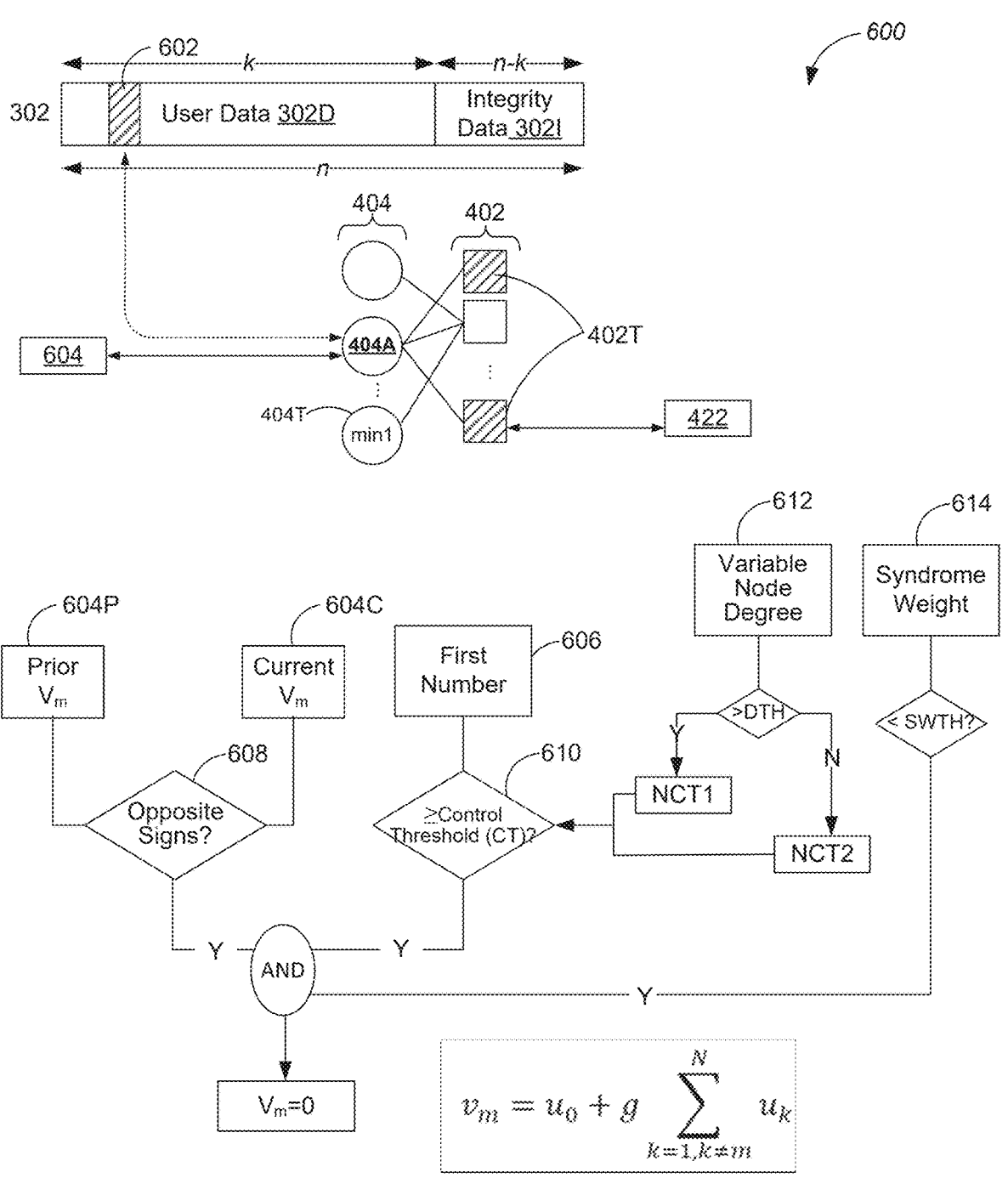
FIG. 6 is a flow diagram of an example process for validating data, in accordance with some embodiments.

FIG. 6 is a flow diagram of an example process 600 for validating data, in accordance with some embodiments. The process 600 is implemented by a memory controller 202 to validate a block of data 302 and correct one or more bit errors in a block of data 302 during the course of reading the block of data 302 from associated non-volatile memory (e.g., memory channels 214). The block of data 302 includes a first data bit 602 represented by a first variable node 404A. The first variable node 404A is associated with a set of check nodes 402 corresponding to a set of parity-check equations. The first variable node 404A is applied in each of the set of parity-check equations, and each parity-check equation further includes a set of data bits corresponding to a set of respective variable nodes 404 that includes the first variable node 404A. Stated another way, each of the set of check nodes 402 associated with the first variable node 404A is further associated with the set of respective variable nodes 404 including the first variable node 404A. During data validation, messages including variable node data 604 and check node data 422 are exchanged between the first variable node 404A and the set of check nodes 402 and between each of the set of check nodes 402 and the set of respective variable nodes 404. For clarification, in some embodiments, each check node 402 is configured to verify validity of a set of data bits including the first data bit 602, and the check node data 422 of each of the set of check nodes 402 indicates a likelihood of the set of data bits being erroneous.

For data verification, the memory controller 202 obtains check node data 422 (FIG. 4B) from each of the set of check nodes 404. The check node data 422 identifies at least a respective target node 404T providing the smallest variable node data among the set of respective variable nodes 404. For example, referring to FIG. 4B, the check node data 422 includes a first index data item 430 (Min1 Index) and a first likelihood data item 426 (Min1 Magnitude). The first index data item 430 identifies the respective target node 404T, and the first likelihood data item 426 includes the variable node data 604 of the respective target node 404T, which is the smallest among the variable node data 604 of the set of respective variable nodes 404 corresponding to a respective check node 402. In some embodiments, for a subset of the check nodes 402 associated with the first variable node 404A, the respective target node 404T is the first variable node 404A. The memory controller 202 identifies the subset of check nodes 402T for each of which the check node data 422 identifies the first variable node 404A as the respective target node 404T. The memory controller 202 further determines that the subset of check nodes 402T includes a first number 606 of check nodes 402T. The variable node data 604 of the first variable node 404A is determined (e.g., updated for a current iteration) based on the first number 606.

In some embodiments, a prior value 604P of the variable node data 604 of the first variable node 404A is obtained from a last iteration. A current value 604C of the variable node data 604 of the first variable node 404A is determined based on the check node data 422 of the set of check nodes 402. The prior value 604P and the current value 604C are compared (operation 608) to determine whether the values 604P and 604C have opposite signs. In accordance with a determination that the prior value 604P and the current value 604C have opposite signs, the variable node data 604 of the first variable node 404A is determined based on the first number 606, e.g., the current value 604C is updated based on the first number 606. Stated another way, the first number 606 is compared (operation 610) with a control threshold CT (e.g., equal to 3). Further, in some embodiments, in accordance with a determination that the prior value 604P and the current value 604C have opposite signs and that the first number is less than a control threshold CT, the variable node data 604 of the first variable node 404A is set to 0, i.e., the current value 604C is equal to 0. Alternatively, in some embodiments, in accordance with a determination that the prior value 604P and the current value 604C have the same sign or that the first number 606 is equal to or greater than (≥) a control threshold, the variable node data 604 of the first variable node 404A remains the current value 604C.

In an example, if the first variable node 404A is used in 20 parity-check equations, and connected to 20 corresponding check nodes 402. The control threshold CT is equal to 5. In some situations, among the 20 check nodes 402, the first index data items 430 of 4 check nodes identify their respective target nodes 404T as the first variable node 404A. The first variable node 404A provides the smallest variable node data (i.e., has a highest probability of being an error bit) among the respective set of the variable nodes 404 connected to each of the 4 check nodes 402T. If the signs of the current value 604C and the prior value 604P of the first variable node 404A are opposite to each other, the current value 604C of the variable node data 604 of the first variable node 404A is set to 0. Conversely, the first index data items 430 of more than 5 (e.g., 10) check nodes identify their respective target nodes 404T as the first variable node 404A. Given that the first variable node 404 is identified as having a high probability of being an error bit for so many check nodes 402T, the current value 604C is not adjusted even if the signs of the current value 604C and the prior value 604P of the first variable node 404A are opposite to each other.

For each check node 404, if the first variable node 404A provides the minimum value among the set of respective variable nodes 404, the first variable node 404A corresponds to a lowest confidence score and has a highest probability of being an error bit. The higher the first number 606, the higher the probability of the first variable node 404A being an error bit that needs to be flipped. As the first number 606 reaches and goes beyond the control threshold CT, the current value 604C of the variable node data 604 is adopted for the first variable node 404A based on a relatively high probability of the first variable node 404A being an error bit that needs to be flipped. Conversely, as the first number 606 is lower than the control threshold CT, the first variable node 404A may not have a high probability of being an error bit and could be flipped by mistake. As such, the current value 604C of the variable node data 604 is not adopted for the first variable node 404A, and the variable node data 604 of the first variable node 404A is set to 0 to reduce a probability of the first variable node 404A being selected to be flipped.

In some embodiments, the control threshold CT is controlled based on a variable node degree 612 of the first variable node 404A. The variable node degree 612 is determined based on a number of check nodes 402 in the set of check nodes 402 associated with the first variable node 404A. Further, in some embodiments, in accordance with a determination that the variable node degree 612 is greater than a degree threshold DT (e.g., 20), the control threshold CT to a first threshold value NCT1. Conversely, in accordance with a determination that the variable node degree 612 is less than or equal to (≤) the degree threshold DTH, the control threshold CT is set to a second threshold value NCT2. The first threshold value NCT1 (e.g., 10) greater than the second threshold value (e.g., 5). It is noted that, in some embodiments, in accordance with a determination that the variable node degree 612 is greater than or equal to (≥) the degree threshold DT, the control threshold CT to the first threshold value NCT1; and in accordance with a determination that the variable node degree 612 is less than (<) the degree threshold DTH, the control threshold CT is set to a second threshold value NCT2.

In some embodiments, the current value 604C of the variable node data 604 of the first variable node 404A is determined based on a linear combination of the check node data 422 of the set of check nodes 402 and an intrinsic likelihood $u_0$ of the first data bit 602 (e.g., in equation (7)). More details on determining the variable node data 604 are described above with reference to FIGS. 4A-4C and equations (3)-(7). Further, in some embodiments, the memory controller 202 reads a plurality of bit values of the first data bit 602 using a plurality of read voltage levels, and determines the intrinsic likelihood $u_0$ of the first data bit 602 based on the plurality of bit values. Additionally, in some embodiments, a scaling factor g is applied to the check node data 422 of each check node 402 in the linear combination. More details on a determination of the intrinsic likelihood $u_0$ of the first data bit 602 are described below with reference to FIG. 7. More details on the scaling factor are described below with reference to FIGS. 4A-4C.

In some embodiments, the block of data 302 corresponds to a total number of check nodes 402. A syndrome weight 614 of the block of data 302 indicates an error rate of the total number of check nodes 402. In accordance with a determination that the syndrome weight 614 is greater than a syndrome threshold $SW_{TH}$, the variable node data 604 of the first variable node 404A is determined based on the first number. Further, in some embodiments, in accordance with a determination that (1) the prior value 604P and the current value 604C have opposite signs, (2) that the first number is less than the control threshold CT, and (3) that the syndrome weight 614 is greater than the syndrome threshold $SW_{TH}$, the variable node data 604 of the first variable node 404A is set to 0. Conversely, in some embodiments, in accordance with a determination (1) that the prior value 604P and the current value 604C have the same sign, (2) that the first number is greater than and equal to (≥) a control threshold, or (3) that the syndrome weight 614 is equal to or less than (≤) the syndrome threshold $SW_{TH}$, the variable node data 604 of the first variable node 404A is set to the current value 604C.

In some embodiments, in an LDPC process, the check node data 422 of each check node 402 include a sign bit 424, a first likelihood data item 426 (min1 Magnitude), a second likelihood data item 428 (min2 Magnitude), and a first index data item 430 (Min1 Index) (FIG. 4B). The variable node data 604 of the first variable node 404A is determined as follows:

```
if (min1 index = index of this variable node)
    u_k=min2
    index_match_k= 1
else
    u_k=min1
    index_match_k= 0
Num_index_matches = Σ_(k = 1, k ≠ m)^N[ index_match] _k
if (sign of v_m in previous iteration is different) &&
(Num_index_matches< N)
    v_m=0
else
    v_m = u_0 + gΣ_(k = 1, k ≠ m)^N u_k
``` where Num_index_matches represents the first number 606, which is a node count of the subset of clock nodes 402T for each of which the check node data 422 identifies the first variable node 404A as the respective target node 404T. In some embodiments, the variable node data 604 are adaptively set to 0 in selected situations during seven-strobe soft read operations of a NAND SSD flash. Correction strength of the LDPC decode using the min-sum algorithm is improved (e.g., by 1%).

Figure 7:
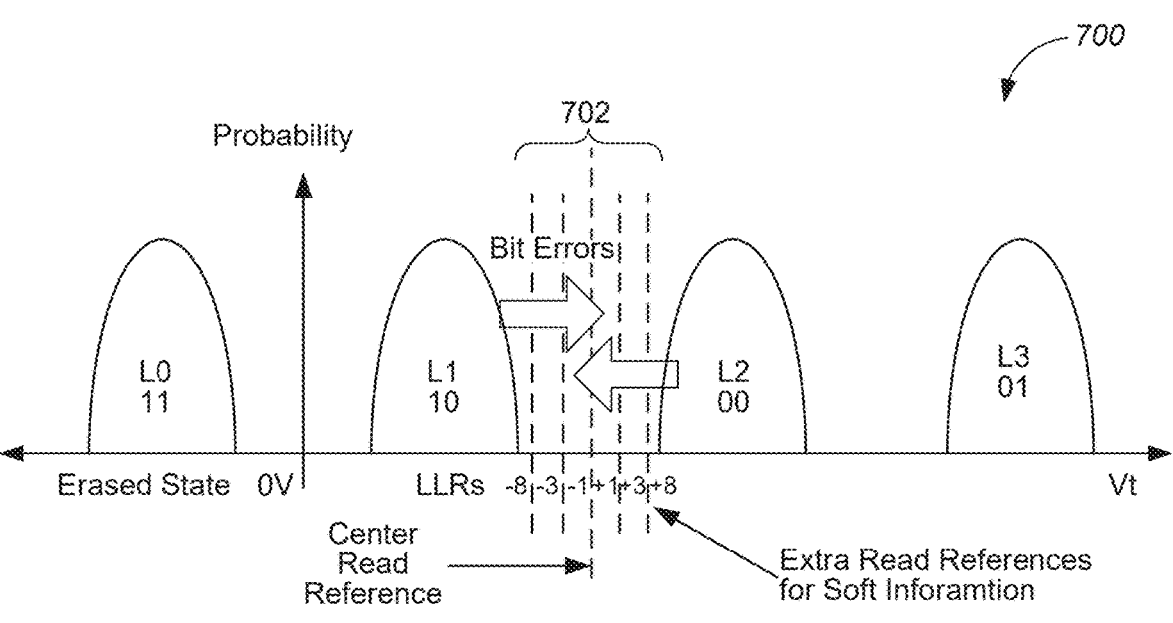
FIG. 7 illustrates an example soft bit read process, in accordance with some embodiments.

FIG. 7 illustrates an example soft bit read process 700, in accordance with some embodiments. In some embodiments, intrinsic LLR data (e.g., intrinsic likelihood $u_0$) corresponds to initial variable node data of each variable node 404 associated with a respective codeword bit of a codeword 302. The intrinsic LLR data is determined based on a log-likelihood ratio (LLR) that is approximated in equation (10). The intrinsic LLR data is determined based on data measured when a read reference voltage is adjusted for the memory system 200.

In some embodiments, the memory system 200 includes a multi-level cell (MLC) NAND flash memory chip, and each memory cell stores 2 data bits, which are optionally equal to one of four value combinations of "00," "01," "10," and "11." Every two successive value combinations (e.g., "10" and "00") correspond to a threshold voltage configured to differentiate the two successive value combinations. For example, in accordance with a determination that an input read voltage is less than the threshold voltage, a first value combination L1 (e.g., "10") is extracted. Conversely, in accordance with a determination that the input read voltage is equal to or greater than the threshold voltage, a second value combination L2 (e.g., "00") is extracted. In some situations, the threshold voltage is in the middle of voltage values corresponding to the first and second value combinations L1 and L2. Alternatively, in some situations, the threshold voltage deviates from the middle of voltage values corresponding to the first and second value combinations L1 and L2. During a soft bit read, multiple NAND reads are applied, such that the input read voltage is varied in a voltage range 702 including the threshold voltage. In some embodiments, as the input read voltage is varied during the multiple NAND reads, a current flowing through the MLC cell is measured to determine the threshold voltage between the value combinations L1 and L2, and each value combination result are represented as soft information (e.g., an integer approximation of the threshold voltage). The value combination results corresponding to the multiple NAND reads are further combined to determine an intrinsic likelihood $u_0$ of a variable node 404 corresponding to this memory cell.

In some embodiments, each of the two bits is read at a time. A read reference between L1 and L2 is applied to get the most significant bit of the levels. Two read references between L0-L1 and L2-L3 are applied to get the least significant bit of the levels. In an example, these bits across typically around 150,000 NAND memory cells, are read as the lower page and the upper page, respectively. Multiple read voltages are applied for each of the two bits during the soft bit read, and the intrinsic likelihood $u_0$ of a variable node 404 corresponding to this memory cell is determined based on data read from the memory cell as the multiple read voltages are successively applied to read pages of memory cells jointly.

Figure 8:
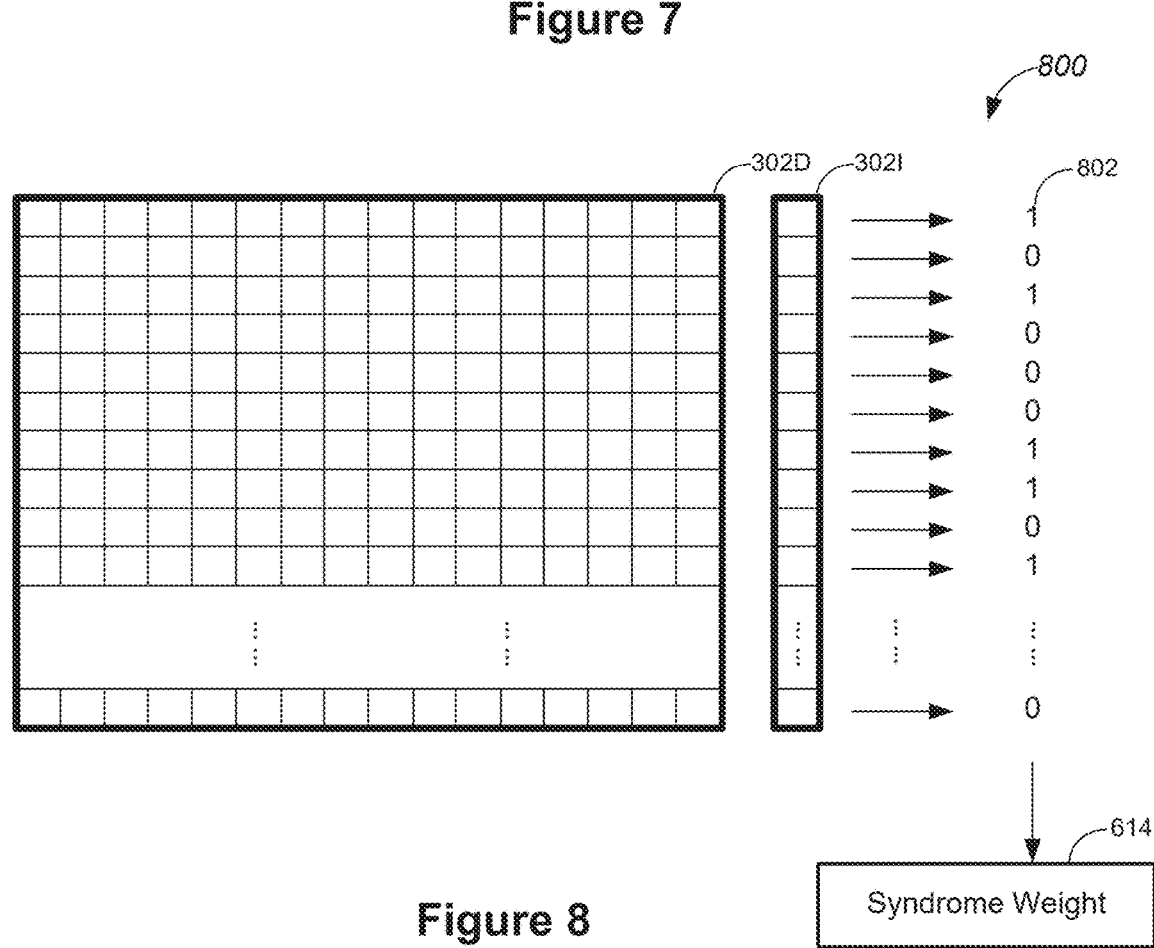
FIG. 8 is a flow diagram of an example process of determining a syndrome weight of a data block, in accordance with some embodiments.

FIG. 8 is a flow diagram of an example process 800 of determining a syndrome weight 614 of a data block (e.g., a codeword 302 in FIG. 3), in accordance with some embodiments. The memory device 240 (specifically, a controller 218 in FIG. 2) applies a plurality of validation operations by applying each respective validation operation of the plurality of validation operations on the data block to generate a corresponding validity result 802 indicating whether the respective validation operation has succeeded. Further, in some embodiments, each validation operation includes an XOR-based parity check on a subset of the data block including both user data and associated integrity data.

In some embodiments, the respective validity result 802 is equal to a first validity result (e.g., "1") indicating that the respective validation operation has failed or a second validity result (e.g., "0") indicating that the respective validation operation has succeeded. The memory device 240 determines that the plurality of validity results include a first number of first validity results and determines the syndrome weight 614 based on the first number of first validity results. Additionally, in some embodiments, the syndrome weight 614 is defined as a ratio of the first number of first validity results of a total number of the plurality of validity results. In some embodiments, the controller 218 of the memory device 240 has an on-die LDPC syndrome calculator for determining the syndrome weight 614.

In some embodiments, the data block sampled to determine the syndrome weight 614 has a memory size (MS), e.g., 1 KB. Each validation operation includes an XOR-based parity check on N data bits (e.g., 16 bits) of the user data 302D and 1 data bit of the integrity data 302I. The plurality of validation operations includes M validation operations, where MS is equal to a product of N and M. No data bit of the user data 302D and the integrity data 302I is used in more than one validation operation, and the integrity data has M bits. For example, the memory size MS is 1 KB (i.e., 8,192 bits). M and N are integers, and for example, equal to 512 and 16, respectively.

FIG. 9 is a flow diagram of an example method 900 of validating data, in accordance with some embodiments. The method 900 is implemented at an electronic device including the memory system 200 (FIG. 2). The electronic device identifies (operation 902) a set of check nodes 402 associated with a first variable node 404A that corresponds to a first data bit 602 in a block of data 302, and obtains (operation 904) check node data 422 from each of the set of check nodes 402. Each of the set of check nodes 402 is associated (operation 906) with a set of respective variable nodes 404 including the first variable node 404A, and the check node data 422 identifies at least a respective target node 404T providing the smallest variable node data among the set of respective variable nodes 404. The electronic device identifies (operation 908) a subset of the set of check nodes 402 for each of which the check node data 422 identifies the first variable node 404A as the respective target node 404T, and determines (operation 910) that the subset of the set of check nodes 402 includes a first number 606 of check nodes 402. Variable node data 604 of the first variable node 404A is determined (operation 912) based on the first number 606.

In some embodiments, the electronic device determines variable node data 604 of the first variable node 404A based on the first number 606 by obtaining a prior value of the variable node data 604 of the first variable node 404A from a last iteration and determining a current value 604C of the variable node data 604 of the first variable node 404A based on the check node data 422 of the set of check nodes 402. The variable node data 604 of the first variable node 404A is determined based on the first number 606, in accordance with a determination that the prior value and the current value 604C have opposite signs.

Further, In some embodiments, the electronic device determines variable node data 604 of the first variable node 404A based on the first number 606 by, in accordance with a determination that the prior value and the current value 604C have opposite signs and that the first number 606 is less than a control threshold CT, setting the variable node data 604 of the first variable node 404A to 0. Conversely, in some embodiments, the electronic device determines variable node data 604 of the first variable node 404A based on the first number 606 by in accordance with a determination that the prior value and the current value 604C have the same sign or that the first number 606 is equal to or greater than (≥) a control threshold CT, setting the variable node data 604 of the first variable node 404A to the current value 604C. Additionally, In some embodiments, the electronic device determines a variable node degree 612 of the first variable node 404A based on a number of check nodes 402 in the set of check nodes 402 associated with the first variable node 404A and sets the control threshold CT based on the variable node degree 612 of the first variable node 404A.

In some embodiments, in accordance with a determination that the variable node degree 612 is greater than a degree threshold DTH, the electronic device sets the control threshold CT to a first threshold value. In accordance with a determination that the variable node degree 612 is less than or equal to (≤) the degree threshold DTH, the electronic device sets the control threshold CT to a second threshold value; the first threshold value greater than the second threshold value.

In some embodiments, the current value 604C of the variable node data 604 of the first variable node 404A is determined based on a linear combination of the check node data 422 of the set of check nodes 402 and an intrinsic likelihood of the first data bit 602.

Further, in some embodiments, the electronic device reads a plurality of bit values of the first data bit 602 using a plurality of read voltage levels and determines the intrinsic likelihood of the first data bit 602 based on the plurality of bit values.

In some embodiments, the electronic device applies a scaling factor g to the check node data 422 of each of the set of check nodes 402 in the linear combination.

In some embodiments, the block of data corresponds to a total number of check nodes 402. The electronic device determines a syndrome weight 614 of the block of data indicating an error rate of the total number of check nodes 402. In accordance with a determination that the syndrome weight 614 is greater than a syndrome threshold SWTH, the variable node data 604 of the first variable node 404A is determined based on the first number 606.

Further, in some embodiments, the electronic device determines variable node data 604 of the first variable node 404A based on the first number 606 by setting the variable node data 604 of the first variable node 404A to 0, in accordance with a determination (1) that a prior value and a current value 604C have opposite signs, (2) that the first number 606 is less than a control threshold CT, and (3) that the syndrome weight 614 is greater than the syndrome threshold SWTH. Conversely, In some embodiments, the electronic device determines variable node data 604 of the first variable node 404A based on the first number 606 by, in accordance with a determination (1) that a prior value 604P and a current value 604C do not have opposite signs, (2) that the first number 606 is greater than or equal to (≥) a control threshold CT, or (3) that the syndrome weight 614 is equal to or less than (≤) the syndrome threshold SWTH, setting the variable node data 604 of the first variable node 404A to the current value 604C.

In some embodiments, each check node is configured to verify validity of a set of data bits including the first data bit 602, and the check node data 422 of each of the set of check nodes 402 indicates a likelihood of the set of data bits being erroneous.

Memory is also used to store instructions and data associated with the method 900, and includes high-speed random-access memory, such as SRAM, DDR DRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 900. Alternatively, in some embodiments, the electronic device implements the method 900 at least partially based on an ASIC. The memory system 200 of the electronic device includes an SSD in a data center or a client device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments.

In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method implemented at an electronic device for data validation, comprising:

identifying a set of check nodes associated with a first variable node that corresponds to a first data bit in a block of data;

obtaining check node data from each of the set of check nodes, wherein each of the set of check nodes is associated with a set of respective variable nodes including the first variable node, and the check node data identifies at least a respective target node providing the smallest variable node data among the set of respective variable nodes;

identifying a subset of the set of check nodes for each of which the check node data identifies the first variable node as the respective target node;

determining that the subset of the set of check nodes includes a first number of check nodes; and determining variable node data of the first variable node based on the first number;

wherein each check node is configured to verify validity of a set of data bits including the first data bit, and the check node data of each of the set of check nodes indicates a likelihood of the set of data bits being erroneous.

2. The method of claim 1, wherein determining variable node data of the first variable node based on the first number further comprises:

obtaining a prior value of the variable node data of the first variable node from a last iteration; and determining a current value of the variable node data of the first variable node based on the check node data of the set of check nodes;

wherein the variable node data of the first variable node is determined based on the first number, in accordance with a determination that the prior value and the current value have opposite signs.

3. The method of claim 2, wherein determining variable node data of the first variable node based on the first number further comprises:

in accordance with a determination that the prior value and the current value have opposite signs and that the first number is less than a control threshold, setting the variable node data of the first variable node to 0.

4. The method of claim 2, wherein determining variable node data of the first variable node based on the first number further comprises:

in accordance with a determination that the prior value and the current value have the same sign or that the first number is equal to or greater than ($\geq$) a control threshold, setting the variable node data of the first variable node to the current value.

5. The method of claim 4, further comprising:

determining a variable node degree of the first variable node based on a number of check nodes in the set of check nodes associated with the first variable node; and setting the control threshold based on the variable node degree of the first variable node.

6. The method of claim 5, further comprising:

in accordance with a determination that the variable node degree is greater than a degree threshold, setting the control threshold to a first threshold value; and in accordance with a determination that the variable node degree is less than or equal to ($\leq$) the degree threshold, setting the control threshold to a second threshold value, the first threshold value greater than the second threshold value.

7. The method of claim 2, wherein the current value of the variable node data of the first variable node is determined based on a linear combination of the check node data of the set of check nodes and an intrinsic likelihood of the first data bit.

8. The method of claim 7, further comprising:

reading a plurality of bit values of the first data bit using a plurality of read voltage levels; and determining the intrinsic likelihood of the first data bit based on the plurality of bit values.

9. The method of claim 7, further comprising:

applying a scaling factor to the check node data of each of the set of check nodes in the linear combination.

10. The method of claim 1, wherein the block of data corresponds to a total number of check nodes, the method further comprising:

determining a syndrome weight of the block of data indicating an error rate of the total number of check nodes, wherein in accordance with a determination that the syndrome weight is greater than a syndrome threshold, the variable node data of the first variable node is determined based on the first number.

11. The method of claim 10, wherein determining variable node data of the first variable node based on the first number further comprises:

in accordance with a determination (1) that a prior value and a current value have opposite signs, (2) that the first number is less than a control threshold, and (3) that the syndrome weight is greater than the syndrome threshold, setting the variable node data of the first variable node to 0.

12. The method of claim 10, wherein determining variable node data of the first variable node based on the first number further comprises:

in accordance with a determination (1) that a prior value and a current value do not have opposite signs, (2) that the first number is greater than or equal to ($\geq$) a control threshold, or (3) that the syndrome weight is equal to or less than ($\leq$) the syndrome threshold, setting the variable node data of the first variable node to the current value.

13. An electronic device, comprising:

one or more processors; and memory storing one or more programs for execution by the one or more processors, the one or more programs including instructions for:

identifying a set of check nodes associated with a first variable node that corresponds to a first data bit in a block of data;

obtaining check node data from each of the set of check nodes, wherein each of the set of check nodes is associated with a set of respective variable nodes including the first variable node, and the check node data identifies at least a respective target node providing the smallest variable node data among the set of respective variable nodes;

identifying a subset of the set of check nodes for each of which the check node data identifies the first variable node as the respective target node;

determining that the subset of the set of check nodes includes a first number of check nodes; and determining variable node data of the first variable node based on the first number;

wherein each check node is configured to verify validity of a set of data bits including the first data bit, and the check node data of each of the set of check nodes indicates a likelihood of the set of data bits being erroneous.

14. The electronic device of claim 13, wherein determining variable node data of the first variable node based on the first number further comprises:

obtaining a prior value of the variable node data of the first variable node from a last iteration; and determining a current value of the variable node data of the first variable node based on the check node data of the set of check nodes;

wherein the variable node data of the first variable node is determined based on the first number, in accordance with a determination that the prior value and the current value have opposite signs.

15. The electronic device of claim 14, wherein determining variable node data of the first variable node based on the first number further comprises:

in accordance with a determination that the prior value and the current value have opposite signs and that the first number is less than a control threshold, setting the variable node data of the first variable node to 0.

16. The electronic device of claim 14, wherein determining variable node data of the first variable node based on the first number further comprises:

in accordance with a determination that the prior value and the current value have the same sign or that the first number is equal to or greater than ($\geq$) a control threshold, setting the variable node data of the first variable node to the current value.

17. A non-transitory computer-readable storage medium storing one or more programs for execution by one or more processors, the one or more programs comprising instructions for:

identifying a set of check nodes associated with a first variable node that corresponds to a first data bit in a block of data;

obtaining check node data from each of the set of check nodes, wherein each of the set of check nodes is associated with a set of respective variable nodes including the first variable node, and the check node data identifies at least a respective target node providing the smallest variable node data among the set of respective variable nodes;

identifying a subset of the set of check nodes for each of which the check node data identifies the first variable node as the respective target node;

determining that the subset of the set of check nodes includes a first number of check nodes; and determining variable node data of the first variable node based on the first number;

wherein each check node is configured to verify validity of a set of data bits including the first data bit, and the check node data of each of the set of check nodes indicates a likelihood of the set of data bits being erroneous.

18. The non-transitory computer-readable storage medium of claim 17, wherein determining variable node data of the first variable node based on the first number further comprises:

obtaining a prior value of the variable node data of the first variable node from a last iteration; and determining a current value of the variable node data of the first variable node based on the check node data of the set of check nodes;

wherein the variable node data of the first variable node is determined based on the first number, in accordance with a determination that the prior value and the current value have opposite signs.

19. The non-transitory computer-readable storage medium of claim 17, wherein the block of data corresponds to a total number of check nodes, the one or more programs further comprising instructions for:

determining a syndrome weight of the block of data indicating an error rate of the total number of check nodes, wherein in accordance with a determination that the syndrome weight is greater than a syndrome threshold, the variable node data of the first variable node is determined based on the first number.

20. The electronic device of claim 13, wherein the block of data corresponds to a total number of check nodes, the one or more programs further comprising instructions for:

determining a syndrome weight of the block of data indicating an error rate of the total number of check nodes, wherein in accordance with a determination that the syndrome weight is greater than a syndrome threshold, the variable node data of the first variable node is determined based on the first number.

* * * * *